United States Patent
Beckmann

(12) 
(10) Patent No.: US 6,914,020 B1
(45) Date of Patent: Jul. 5, 2005

(54) SOUND AND HEAT INSULATION MATERIAL

(75) Inventor: Friedhelm Beckmann, Hiddenhausen (DE)

(73) Assignee: Moeller Tech GmbH, Bielefeld (DE)

( * ) Notice: Subject to any disclaimer, the term of this patent is extended or adjusted under 35 U.S.C. 154(b) by 480 days.

(21) Appl. No.: 09/501,013

(22) Filed: Feb. 9, 2000

(30) Foreign Application Priority Data

Feb. 9, 1999 (DE) .......................................... 199 05 226

(51) Int. Cl.⁷ .............................. B32B 5/14; B32B 5/18; B32B 5/24
(52) U.S. Cl. ...................... 442/222; 442/181; 442/199; 442/200; 442/221; 442/223; 442/225; 442/315; 428/398
(58) Field of Search ................................ 442/181, 199, 442/200, 221, 222, 223, 225, 315; 428/398

(56) References Cited

U.S. PATENT DOCUMENTS

| 3,934,066 A | * | 1/1976 | Murch | 428/248 |
| 4,780,359 A | * | 10/1988 | Trask et al. | 428/234 |
| 4,987,026 A | * | 1/1991 | Jacobs et al. | 422/146 |
| 5,527,598 A | * | 6/1996 | Campbell et al. | 428/251 |

* cited by examiner

*Primary Examiner*—Norca L. Torres
(74) *Attorney, Agent, or Firm*—Laurence A. Greenberg; Werner H. Stemer; Ralph E. Locher

(57) ABSTRACT

A sound and heat insulation material for insulating buildings, motor vehicles, conduits, etc., is covered on at least one exterior surface with a material which reacts at a given temperature by foaming up, and which is difficult to ignite or inflammable. The exterior covering can be a sheet or fiber layer which is impregnated with the reactive material or coated with it. The fibers of the sound and heat insulation core layer can also be directly coated with the reactive material or be mingled with a variable proportion of foamable fibers. The sound and heat insulation element, which is difficult or impossible to ignite, has good insulating properties.

22 Claims, 1 Drawing Sheet

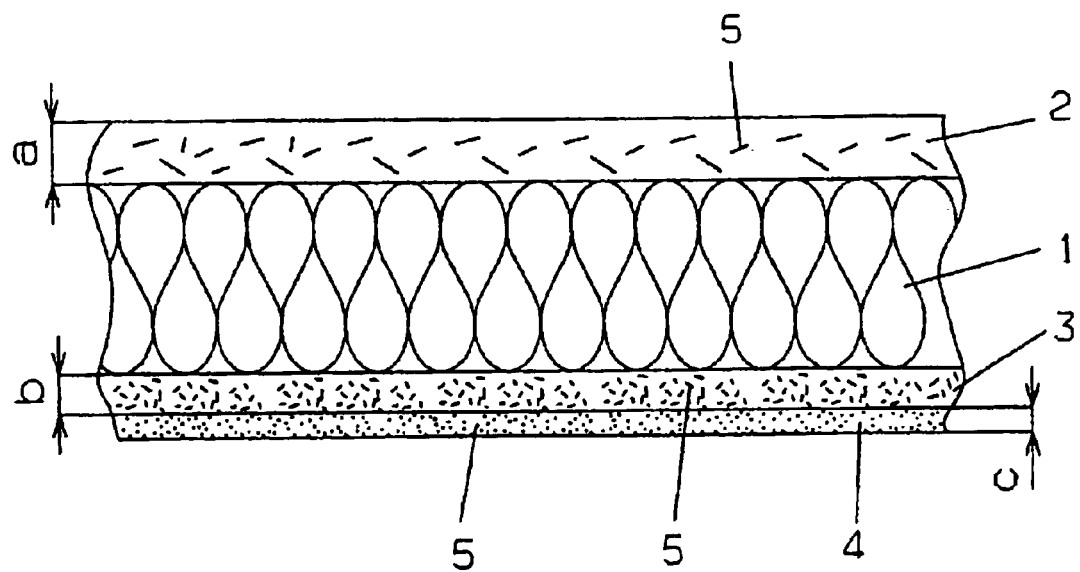

SOUND AND HEAT INSULATION MATERIAL

BACKGROUND OF THE INVENTION

FIELD OF THE INVENTION

The invention relates to a sound and heat insulation material for insulating buildings, motor vehicles, pipes, and the like. The sound and heat insulation material is made from fibers or similar substances to which a fire retardant is added.

These insulation materials serve to decrease the conduction of heat and the transmission of sound in buildings, motor vehicles, pipes and machinery. The insulation material is made, among other things, of natural and/or synthetic fibers which ignite under the influence of heat, with the concomitant danger of emitting toxic gases. Such insulation materials thus can present a significant danger for humans and their environment. For this reason, materials used for insulation must meet high standards not only for their properties of insulating sound transmission and heat conduction but also with regard to fire safety.

The addition of fire retardant materials, such as nitrogen, borax, halogens or phosphorus containing compounds, produces a clear increase in ignition temperature. Moreover, the action of heat on the different materials used must not release any toxic gases. For this reason, when producing fiber mats and similar products, the fibers are held together by non-toxic binding materials, and the use of additional substances to further decrease toxic emissions is necessary.

These measures, which involve a coordinated addition of various flame retardant substances, depending on the respective requirements of the particular application, result in a significant increase in production expenditure and in an increased price for the insulation materials, in order to achieve the required fire protection properties. Moreover, these measures for decreasing the flammability and decreasing the emission of toxic gases do not satisfy the rising demands being made of such insulating materials.

SUMMARY OF THE INVENTION

It is accordingly an object of the invention to provide a sound and heat insulation material which overcomes the above-mentioned disadvantages of the heretofore-known insulation materials of this general type and which has a significantly reduced flammability, compared to that of currently available insulation materials, and which can be produced with a reduced production expenditure at a reduced price.

With the foregoing and other objects in view there is provided, in accordance with the invention, a sound and heat insulation material having a core layer including at least one of fibers and fiber-type materials and having at least one outer surface, the at least one of fibers and fiber-type materials being provided with a fire retardant additive; and a covering layer including a reactivateable material for covering the core layer at the at least one outer surface, the reactivateable material being at least difficult to ignite and being foamable at a given temperature.

In other words, the object of the invention is achieved by a sound and heat insulation material with a core layer of fibers or similar substances and an additional fire retarding component, wherein at least one external surface of the core layer is covered with a layer of reactivateable material which is difficult or impossible to ignite and which foams up at a predetermined temperature.

At a certain temperature below the inflammation point, the reactive material foams up, so that the insulating core layer, which serves as the insulating layer, is isolated from high temperatures when the material is subjected to heat and, so that no oxygen, which is required for a combustion, can make its way to the flammable material of the core layer, or so that oxygen which is already present there cannot be activated. An ignition of the core layer of the insulation material is delayed or completely prevented.

According to a further feature of the invention, two or more materials or layers of material, which are reactivateable at different temperatures, are used.

In accordance with another feature of the invention, the core layer is a heat insulating mat made of fibers and has on one or more exterior surfaces a sheet, a foil or a layer of fibers impregnated or interspersed with the reactive material or is coated with a surface active layer.

In accordance with yet another feature of the invention, two or more reactivateable fiber layers of differing thicknesses which foam up at different temperatures are provided.

In accordance with an advantageous feature of the invention, the fibers of the core layer itself are coated with a reactive material or mingled or interspersed with reactivateable fibers.

In accordance with another feature of the invention, the covering layer is a woven fabric or a knit fabric which includes fibers formed of the reactivateable material or coated or sprayed with the reactivateable material.

In accordance with yet another feature of the invention, the covering layer includes one or more reactivateable fiber layers having cut, foamable fibers scattered directly onto the core layer. The cut, foamable fibers have a given length and a given cross-sectional diameter. The cover layer may also include synthetic material, natural material, renewable material, carbon fibers or glass fibers. The core layer may, include synthetic fibers, natural fibers, renewable fibers, glass fibers, mineral fibers or carbon fibers.

In accordance with a further feature of the invention, the reactivateable material is non-flammable or self-extinguishing.

In accordance with yet a further feature of the invention, a foil, a cardboard, or any sheet-like material can be attached to the outer surface of the core layer for producing a mat configuration.

Other features which are considered as characteristic for the invention are set forth in the appended claims.

Although the invention is illustrated and described herein as embodied in a sound and heat insulation material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE is a partial sectional view of a sound and heat insulation element according to the invention.

DESCRIPTION OF THE PREFERRED EMBODIMENTS

Referring now to the single FIGURE in detail there is shown the core layer 1 of the sound and heat insulation material which is made from a fiber mat or fiber batt that is installed in a wave-like manner. The fiber mat is formed for example of a natural substance made of renewable raw materials and/or of mineral fibers and/or of synthetic fibers. This fiber mat is impregnated with nitrogen or borax so as a fire retardant additive. On one external surface of the core material 1 there is a fiber layer 2 which is reactivateable at 300° C. and which has a thickness "a". On the opposite exterior surface there are two reactivateable fiber layers 3 and 4 of different thicknesses "b" and "c" which foam up at 150° C. and 300° C., respectively. The fiber layers 2, 3, and 4 are made from a woven or knit fabric with differing area weights of foamable fibers 5. The foamable fibers can also be made of a different material which is self-extinguishing. Optionally, a variable proportion of foamable fibers can be added to the core material 1. Instead of using a woven or knit fabric, the fiber layers 2 to 4 can also be made from scattered, cut fibers. In this case, the foamable fibers have different reaction temperatures. In order to form a cohesive mat or a composite mat out of the core material, it is possible to apply a foil, a sheet, cardboard, or similar facings to one or both sides.

At temperatures above 150° C. and 300° C., respectively, the reactive, foamable material is reactivated, which means that it foams up so that the oxygen present in the fiber layers 2 to 4 or in the fibers themselves is not available for a combustion process and no oxygen can penetrate into the core material 1, that is, into the core layer. Since the core material 1 is completely insulated from the exterior by the foaming of the fiber layers 2 to 4 under the action of heat, the inflammation temperature is not reached there, and moreover, the oxygen present in the core layer is not available for a combustion.

In this way, a sound and heat insulation material is produced that provides good insulation properties with its exterior and interior fiber layers and that is difficult or impossible to ignite and virtually eliminates the possibility of producing toxic gases.

I claim:

1. A sound and heat insulation material, comprising:
   a core layer including fibrous material and having at least one outer surface, said fibrous material being provided with a fire retardant additive; and
   a covering layer including a foamable material covering said core layer at said at least one outer surface, said foamable material being at least difficult to ignite and foaming at a given temperature to insulate said core layer from high temperature and oxygen.

2. The sound and heat insulation material according to claim 1, including at least one further foamable material, said at least one further foamable material being foamable at a further given temperature different from said given temperature.

3. The sound and heat insulation material according to claim 1, wherein:
   said core layer is a heat insulation mat and said fibrous material includes at least one element selected from the group consisting of natural fibers, mineral fibers and synthetic fibers; and
   said covering layer includes at least one of a foil and a fiber layer.

4. The sound and heat insulation material according to claim 3, wherein said one of said foil and said fiber layer is impregnated with said foamable material.

5. The sound and heat insulation material according to claim 3, wherein said one of said foil and said fiber layer has a surface-active coating.

6. The sound and heat insulation material according to claim 3, wherein said fiber layer is one of a woven fabric and a knit fabric, said fiber layer includes fibers formed of said foamable material.

7. The sound and heat insulation material according to claim 3, wherein said fiber layer is one of a woven fabric and a knit fabric, said fiber layer includes fibers coated with said foam able material.

8. The sound and heat insulation material according to claim 3, wherein said fiber layer is one of woven fabric and a knit fabric, said fiber layer includes fibers sprayed with said foamable material.

9. The sound and heat insulation material according to claim 1, wherein said covering layer includes at least one foamable fiber layer having cut, foamable fibers scattered directly onto said core layer, said cut, foamable fibers having a given length and a given cross-sectional diameter.

10. The sound and heat insulation material according to claim 1, wherein said covering layer includes at least one foamable fiber layer having at least one element selected from the group consisting of synthetic material, natural material, renewable material, carbon fibers and glass fibers.

11. The sound and heat insulation material according to claim 1, wherein said foamable material is self-extinguishing, said covering layer includes fibers made from said foamable material.

12. The sound and heat insulation material according to claim 1, wherein said at least one outer surface includes a first and a second outer surface, said first outer surface covered by a first material layer foamable at a first temperature, said second outer surface covered by a second material layer foamable at a second temperature different from said first temperature.

13. The sound and heat insulation material according to claim 12, wherein at least one of said first and second material layers is a fiber layer.

14. The sound and heat insulation material according to claim 12, wherein said first material layer has a first layer thickness, said second material layer has a second layer thickness different from said first layer thickness.

15. The sound and heat insulation material according to claim 1, wherein said at least one outer surface includes a given outer surface, said given outer surface is covered by a first material layer foamable at a first temperature and at least by a second material layer foamable at a second temperature different from said first temperature.

16. The sound and heat insulation material according to claim 15, wherein at least one of said material layers is a fiber layer.

17. The sound and heat insulation material according to claim 15, wherein said first material layer has a first layer thickness, said at least second material layer has a second layer thickness different from said first layer thickness.

18. The sound and heat insulation material according to claim 1, wherein said core layer has substantial heat and sound insulation properties and said fibrous material includes at least one element selected from the group consisting of synthetic fibers, natural fibers, renewable fibers, glass fibers, mineral fibers and carbon fibers.

19. The sound and heat insulation material according to claim 18, wherein said fibrous material of said core layer is coated with a further foamable material.

20. The sound and heat insulation material according to claim 18, wherein said fibrous material of said core layer includes foamable fibers.

21. The sound and heat insulation material according to claim 1, including one of a foil, a cardboard, and a sheet-like material attached to said at least one outer surface for producing a mat configuration.

22. The sound and heat insulation material according to claim 1, wherein said foamable material is a non-flammable material.

* * * * *